United States Patent Office 2,734,891
Patented Feb. 14, 1956

2,734,891

UNSATURATED UREIDO ETHERS AND POLYMERS THEREOF

Sidney Melamed, Philadelphia, Pa., assignor to Rohm & Haas Company, Philadelphia, Pa., a corporation of Delaware No Drawing. Application September 7, 1954, Serial No. 454,595

18 Claims. (Cl. 260—77.5)

This invention relates to novel and improved ureidoalkyl vinyl ethers, polymers thereof and processes of making the ethers and their polymers.

The ethers of the present invention comprise ethylenically unsaturated polymerizable compounds falling within the following general formula $$CH_2:CH—O—A—NRCONR'R_2 \qquad I$$

wherein A is a cyclohexylene group or an alkylene group of 2 to 18 carbon atoms, of which a chain of at least two is connected between the adjoining nitrogen and oxygen atoms, R is selected from hydrogen and a monovalent hydrocarbon group of 1 to 18 carbon atoms, R' is an aliphatic or cycloaliphatic hydrocarbon group of 1 to 24 carbon atoms, and $R_2$ is selected from H and aliphatic or cycloaliphatic groups of 1 to 24 carbon atoms. It is characteristic of the compounds of this invention that each N atom of the urea is attached to at least one essentially non-polar group and carries no reactive hydrogen atom or only one reactive hydrogen atom. The peculiar and distinctive character of the new ethers is apparently attributable to this structure as will be pointed out hereinafter.

Aminoalkyl vinyl ethers are known. They are not readily polymerized with small amounts of acid catalysts or free radical catalysts. Alkyl vinyl ethers, on the other hand, are readily polymerized with acid catalysts and are but slightly affected by normal concentrations of peroxidic catalysts. In contrast the substituted ureidoalkyl vinyl ethers of this invention are polymerizable under the influence of azo catalysts, although they do not respond to catalytic quantities of acids or to peroxides whether organic or inorganic under the various conditions which are known to result in polymerization of many vinylidene compounds including other types of vinyl compounds.

Amino-substituted vinyl ethers have been reported to polymerize with molar proportions of sulfur dioxide to give products of relatively low molecular weight which contain units from sulfur dioxide. It has been found that ureidoalkyl vinyl ethers of the present invention likewise polymerize with molar proportions of sulfur dioxide to form products which have low molecular weight and which include sulfur dioxide as a component. These polymers differ in both these respects from the polymers of high molecular weight which are formed in the presence of azo catalysts from ureidoalkyl vinyl ethers. The ureido group actually destroys the ability of alkyl vinyl ethers to respond to catalytic amounts of polymerization initiators of acid type.

The polymers of this invention furthermore are distinct from polymers of allyl derivatives, such as allylurea, which forms only low molecular weight polymers at best. Allylurea, for example, is a powerful chain transfer agent which inhibits formation of other polymers.

Ureidoalkyl vinyl ethers of the formula $$CH_2:CHO—A—NRCONH_2$$

such as ureidoethyl vinyl ether, can be made by reacting an aminoalkyl vinyl ether, such as aminoethyl vinyl ether, with a water-soluble cyanate, such as potassium cyanate, in the presence of an acid, such as sulfuric acid, at a temperature of 0° to 50° C. and a pH of at least 6.8. These ethers are polymerizable under certain conditions. The ethers of the present invention cannot be made by this reaction but require special procedures as will be pointed out.

Attempts to obtain $$CH_2:CH—O—C_2H_4NHCON(CH_3)_2$$

and closely related compounds, such as by reacting $$CH_2:CH—OC_2H_4NH_2$$

with dimethyl carbamyl chloride $((CH_3)_2NCOCl)$, fail completely since the unsaturated vinyl group is lost, apparently by cyclization.

Surprisingly, however, it has been found that numerous of the compounds of the invention within the scope of Formula I are of exceptional stability so that they can be isolated without similar loss of unsaturation by cyclization.

One such group of stable compounds are those having the structure of the following formula $$CH_2:CHO—A—NRCONHR' \qquad II$$

where A, R, and R' are the same as defined hereinbefore. Preferred compounds are those in which R is an alkyl or cycloalkyl group and R' is saturated.

Another group includes those having the formula $$CH_2:CHO—A—NR^2CONR'R^3 \qquad III$$

in which A and R' have the same definition as above, $R^2$ is a monovalent hydrocarbon group of 1 to 18 carbon atoms, and $R^3$ is an aliphatic or cycloaliphatic hydrocarbon group of 1 to 24 carbon atoms. Preferred compounds of this group are those in which $R^2$ is an alkyl or cycloalkyl group, and R' is the same as $R^3$ and saturated.

A third group has the formula $$CH_2:CHO—Y—C(R^4)(R^5)NHCONR'R^3 \qquad IV$$

in which R' and $R^3$ are defined hereinabove, Y is an alkylene group of 1 to 7 carbon atoms, $R^4$ is an alkyl group of 1 to 4 carbon atoms, and $R^5$ is an alkyl group of 1 to 4 carbon atoms.

A fourth group comprises compounds of the general formula $$CH_2:CHO—Z—NHCONR'R^3 \qquad V$$

where R' and $R^3$ are as defined above and Z is a cyclohexylene group or an alkylene group of 4 to 18 carbon atoms of which a chain of at least 4 is connected between the adjoining nitrogen and oxygen atoms.

The compounds of Formula II are made by the reaction of isocyanates of the structure R'NCO on aminoalkyl vinyl ethers of the formula $$CH_2:CHO—A—NHR \qquad VI$$

R' and R being as defined above. The reagents are used in about equimolar proportions or an excess of either may be used. The reaction is effected at a temperature of —10° C. to 100° C., preferably —10° C. to 35° C. Inert solvents, e. g. benzene or petroleum ether, may be used but are not necessary in all cases. Typical vinyl ethers (Formula VI) that may be used are:

$$CH^2=CHOCH_2CH_2NH_2$$
$$CH_2=CHOCH_2CH_2NHCH_3$$
$$CH_2=CHOCH_2CH_2CH_2NH_2$$
$$CH_2=CHOCH_2CH(CH_3)NH_2$$
$$CH_2=CHOCH(CH_3)CH_2NH_2$$

$CH_2=CHOCH_2C(CH_3)_2NH_2$ $CH_2=CHOC(CH_3)_2CH_2NH_2$ $CH_2=CHOCH_2CH_2CH_2CH_2NH_2$ $CH_2=CHOC(CH_3)_2CH_2CH(CH_3)NH_2$ $CH_2=CHOCH_2CH_2CH(CH_3)(CH_2)_3C(CH_3)_2NH_2$ $CH_2=CHOCH_2C(CH_3)_2CH_2NH_2$ $CH_2=CHOCH_2CH(CH_3)NHCH_3$

The vinyl aminoalkyl ether may have an N-substituent (R) other than hydrogen and the preferred methyl group, such as ethyl, butyl, phenyl, methylphenyl, butylphenyl, benzyl, methylbenzyl, cyclo hexyl, and so on, typical compounds then being $CH_2=CHOCH_2CH_2NHC_6H_5$ (distilling at 128°–130° C./9 mm.), $CH_2=CHOCH_2CH_2NHC_4H_9$ (distilling at 88°–99° C./120 mm.), $CH_2CHOCH(CH_3)CH_2NHC_2H_5$ (distilling at 72°–73° C./120 mm.), $CH_2=CHOCH_2CH_2NHCH_2C_6H_5$ $CH_2=CHOCH_2CH(CH_3)NHC_6H_4CH_3$ $C_2H=CHOCH_2CH_2NHC_6H_{11}$ $CH_2=CHOCH_2CH_2NHCH_2CH=CH_2$ $CH_2=CHOCH_2CH_2NHCH_2CH=CHCH_3$ $CH_2=CHOCH_2CH_2NH(CH_2)_9CH=CH_2$, $CH_2=CHOCH_2CH_2NHC_{18}H_{33}$ (2 double bonds soya amine), $CH_2=CHOCH_2CH_2NHC_{18}H_{35}$ (oleyl amine),

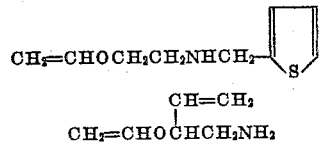

(from butadiene monoxide)

(from vinylcyclohexene monoxide), $CH_2=CHOCH_2CH_2NHCH_2CH_2C\equiv CCH_3$, etc.

The last compound is available, for example, through the reaction of methylacetylene and ethylene oxide to yield $CH_3C\equiv CCH_2CH_2OH$, which is converted to the chloride with thionyl chloride, the chloride being then reacted with ethanolamine to form the alcohol $RNHCH_2CH_2OH$ where R is an alkynyl group. This alcohol reacts with acetylene to form the desired vinyl ether. In forming alkynyl derivatives it is preferred that the multiple linkage occur between intermediate carbons rather than at a terminal carbon.

The alkylene group may be substituted with other than aliphatic groups and may be interrupted with heteroatoms. Also the chain of A may be part of a cycle. Examples of compounds of these sorts are $CH_2=CHOC_6H_{10}NH_2$ $CH_2=CHOCH_2CH_2C_6H_{10}C(CH_3)_2NH_2$ ($C_6H_{10}$ being the cyclohexyl nucleus in both cases).

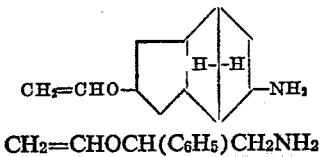

$CH_2=CHOCH(C_6H_5)CH_2NH_2$ $CH_2=CHOCH_2CH_2C(CH_3)(C_6H_5)NH_2$ $CH_2=CHOCH_2CH_2OCH_2CH_2NH_2$ $CH_2=CHOCH_2CH_2OCH_2CH(CH_3)NH_2$ $CH_2=CHOCH_2CH_2OCH_2CH_2NHCH_3$ $CH_2=CHOCH_2CH_2OCH_2CH_2NHC_6H_5$ $CH_2=CHOCH_2CH_2OCH_2CH_2NHCH_2C_6H_5$ $CH_2=CHOCH_2CH_2SCH_2CH_2NH_2$ $CH_2=CHOCH_2CH_2OCH_2CH_2NHC_2H_5$ $CH_2=CHOCH_2CH_2OCH_2CH_2OCH_2CH_2NH_2$

Typical isocyanates (R'NCO) are: methyl isocyanate, ethyl isocyanate, propyl isocyanate, isopropyl isocyanate, butyl isocyanate, isobutyl isocyanate, t-butyl isocyanate, amyl isocyanate, isoamyl isocyanate, cyclohexyl isocyanate, hexyl isocyanate, octyl isocyanate, decyl isocyanate, dodecyl isocyanate, hexadecyl isocyanate, octadecyl isocyanate, oleyl isocyanate, tetracosyl isocyanate, β-chloroethyl isocyanate, β-nitroethyl isocyanate, 3-nitro-3,3-dimethylpropyl isocyanate.

The compounds of Formulas III, IV, and V are made by the reaction of a disubstituted carbamyl chloride of the formula $$R'R^3NCOCl \qquad VII$$

in which R' and $R^3$ have the same definition as above with an amine of any of the following formulas $$CH_2:CHO-A-NHR^2 \qquad VIII$$

$$CH_2:CHO-YC(R^4)(R^5)NH_2 \qquad IX$$

$$CH_2:CHO-Z-NH_2 \qquad X$$

respectively in which the symbols have the same definitions as above. The conditions of the reaction may vary widely. The temperature may be from —10° C. to 100° C., preferably —10 to 50° C. Reaction is preferably effected in all cases in the presence of a basic acceptor for the hydrogen chloride liberated, such as excess of the amine reactant, or an inorganic base, such as NaOH, KOH, $Na_2CO_3$, $K_2CO_3$, etc. The reaction may be effected in an inert solvent such as benzene, toluene, xylene, petroleum ether or in a mixture of such a solvent with water.

Examples of the carbamyl chlorides of Formula VII that may be used are: dimethyl carbamyl chloride, diethyl carbamyl chloride, dipropyl carbamyl chloride, di-isopropyl carbamyl chloride, dibutyl carbamyl chloride, di-isobutyl carbamyl chloride, diamyl carbamyl chloride, dihexyl carbamyl chloride, dicyclohexyl carbamyl chloride, dioctyl carbamyl chloride, didecyl carbamyl chloride, didodecyl carbamyl chloride, dihexadecyl carbamyl chloride, dioctadecyl carbamyl chloride, ditetracosyl carbamyl chloride, methyl ethyl carbamyl chloride, methyl propyl carbamyl chloride, methyl isopropyl carbamyl chloride, methyl butyl carbamyl chloride, methyl cyclohexyl carbamyl chloride, methyl octadecyl carbamyl chloride, ethyl isopropyl carbamyl chloride, ethyl octyl carbamyl chloride, ethyl hexadecyl carbamyl chloride, butyl octadecyl carbamyl chloride, hexyl octyl carbamyl chloride.

Representative amines of Formula VIII include all those listed above as representative of those of Formula VI in which substituent R is other than hydrogen.

Representative amines of Formula IX include $H_2NC(CH_3)_2CH_2OCH:CH_2$ $H_2NC(CH_3)_2(CH_2)_3CH(CH_3)CH_2CH_2OCH:CH_2$ $H_2NC(C_2H_5)_2CH_2OCH:CH_2$ $H_2NC(C_3H_7)_2CH_2OCH:CH_2$ $H_2NC(C_4H_9)_2CH_2OCH:CH_2$ as well as others listed under Formula VI.

Representative amines of Formula X include aminocyclohexyl vinyl ether

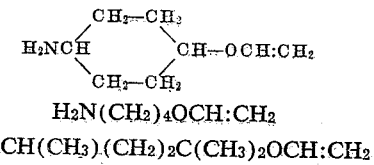

H₂N(CH₂)₄OCH:CH₂

H₂NCH(CH₃)(CH₂)₂C(CH₃)₂OCH:CH₂

H₂NC(CH₃)₂(CH₂)₃CH(CH₃)(CH₂)₂OCH:CH₂

H₂NC(CH₃)₂C₆H₁₀(CH₂)₂OCH:CH₂

C₆H₁₀ being the cyclohexyl nucleus, as well as others listed under Formula VI.

A third method by which certain of the compounds of Formula II and the compounds of Formula IV are produced involves the reaction of isocyanatoalkyl vinyl ethers of the structure $$CH_2=CHO-Y-C(R^4)(R^5)NCO \qquad XI$$

Y, R⁴, and R⁵ being defined above, with primary or secondary amines of the formulas NH₂R' and NHR'R³ respectively. The ethers of Formula XI are disclosed and claimed in copending application Serial No. 348,107, filed April 10, 1953, in the hands of a common assignee. Examples thereof include 2-isocyanatoisobutyl vinyl ether and

CH₂:CHOCH(CH₃)CH₂C(CH₃)₂NCO

Examples of the primary and secondary amines include methylamine, dimethylamine, ethylamine, diethylamine, methylethylamine, and so on within the scope of the definitions of R' and R³ above.

In the new compounds of the present invention, the nitrogen atoms on each side of the urea residue or moiety are substituted by non-polar groups. This structure apparently accounts for the distinctive properties of the compounds as compared to compounds of the type

CH₂:CHO—A—NRCONH₂ as defined above. The properties are:
1. Reduced or no reactivity to such agents as aldehydes, e. g., formaldehyde.
2. Lower melting points and higher vapor pressures so that it is practical to isolate and purify the new compounds, especially those of lower molecular weights, by distillation.
3. Orientation at an oil-water interface such that the two hydrophobic groups extend into the oil layer.
4. Modified solvent power.

In addition, the new polymers have much greater chemical stability, especially against acids or heat as compared to the polymers of CH₂:CHO—A—NRCONH₂; the new polymers are chemically stable in aqueous solutions or dispersions under normal conditions of storage over long periods of time.

The structure of the monomeric compounds also markedly influences the properties of homopolymers and copolymers containing a major proportion of units derived from the new compounds. Such polymers have reduced or no reactivity, especially with such reagents as formaldehyde. Films, filaments, and other articles made of these polymers show surprisingly reduced sensitivity to water. While CH₂:CHOC₂H₄NHCONHCH₃ (compound A) and CH₂:CHOC₂H₄NHCONHC₂H₅ (compound B) are water-soluble, the homopolymers of the former (compound A) have only slight solubility in water and the homopolymers of the latter (compound B) are insoluble in water. In contrast, homopolymers of

CH₂:CHOC₃H₆NCH₃CONH₂ are water-soluble. The simple methylol derivatives of the polymers of compounds A and B, however, obtained by reaction with formaldehyde are water-soluble, but can be insolubilized by prolonged baking or curing. In addition, the homopolymers of compounds A and B are substantially chemically stable in aqueous solutions or suspensions under normal conditions of storage over long periods of time. The new monomeric compounds are more compatible with other monoethylenically unsaturated compounds, such as the alkyl esters of acrylic and methacrylic acid in which the alkyl group may be from 1 to 12 carbon atoms, vinyl acetate, vinyl butyrate, vinyl propionate, than monomers of the type

CH₂:CHOANRCONH₂ so that copolymerization with the compounds can be more readily effected in a solution system. Furthermore, whereas emulsion copolymers can be made containing a minor proportion of units derived from

CH₂:CHO—A—NRCONH₂ with other monoethylenically unsaturated comonomers, such as butyl acrylate, the polymer dispersions obtained are generally not mechanically stable so that impregnations or coatings made therewith must be made promptly after the preparation of the dispersion. In contrast, water-insoluble copolymers of a minor proportion of units derived from the new compounds can be obtained by the emulsion polymerization system and the dispersions thus obtained are mechanically stable over long period of time, making it possible to store or ship the dispersions before making coatings, impregnations, or the like therefrom.

The new monomeric compounds are useful in many ways: as solvents, especially as components of insecticides; for modifying by reacting with cellulosic materials or other OH-group containing substances, such as polyvinyl alcohol, hydroxyethylcellulose, starch, in the forms of films, fibers, fabrics, etc. to modify water-retention properties or to modify the dyeing properties; as components of aminoplast resins such as urea-formaldehyde of melamine-formaldehyde resins; for making adhesives, cements, molding compositions, coating compositions, etc., tending to stabilize the preliminary condensates made on the alkaline side and to accelerate final cure on the acid side. In the final product, the ethers with relatively large hydrocarbon substituents provide an internal plasticizing action, while all of these ethers provide increased resistance to solvents and water for cured films or deposits of the resin made in this way.

Those of the new compounds in which the nitrogen atoms have a reactive hydrogen are useful as chemical intermediates to react with other compounds including aldehydes, such as formaldehyde, alkylene oxides, such as ethylene oxide, to form insecticides, fungicides, pharmaceuticals, textile assistants, resins, etc.

The novel ureidoalkyl vinyl ethers can react with cellulose, polyvinyl alcohols, and other polyhydroxy compounds to give urea-modified materials which can be further reacted with formaldehyde. These ethers are thus useful in modifying cellulosic textile products and plastic materials. The vinoxyalkylureas having one or more large alkyl groups can thus impart hydrophobic properties to materials otherwise sensitive to water. The long chained materials can be used for permanent waterproofing of cellulosic fibers and the like. These compounds also react with nitrogenous fibers.

The new ureidoalkyl vinyl ethers containing hydrocarbon substituents of 8 to 18 carbon atoms have been found compatible with such vinyl resins as polyvinyl chloride. When added to these resins, as by milling, they impart a moderate degree of plasticization, but more particularly they stabilize the resin against degradation by actinic light. Similarly substituted ethers have been found effective as corrosion inhibitors when dissolved in oils. The lower members of the series exhibit insecticidal, miticidal, and ovicidal action.

The new monomeric ethers are polymerizable alone or in combination with each other and/or with one or more other polymerizable unsaturated compounds. They are stable in absence of polymerization catalyst and do not tend to cyclize. This is a distinctive property and surprising since such compounds as $$CH_2:CH-O-CH_2CH_2-NHCON(CH_3)_2$$

cannot be isolated from the products obtained by the reaction of $$CH_2:CHO-CH_2-CH_2NH_2$$

and $$(CH_3)_2\overset{O}{\underset{\|}{N}}\overset{}{C}Cl$$

in accordance with the methods used herein; instead it appears that cyclization occurs producing a saturated compound which contains no polymerizable double bond.

The polymerization of the new compounds is effected in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis($\alpha$-methylbutyronitrile), azobis($\alpha$-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

To effect polymerization the ureidoalkyl vinyl ether and the acyclic azo catalyst are mixed directly or in the presence of an inert solvent and the mixture is maintained between 60° and 100° C. until the desired extent of polymerization is attained. For water-soluble ureidoalkyl vinyl ethers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the ureidoalkyl vinyl ether. The polymerization is best carried out in an inert atmosphere such as nitrogen gas.

For polymerization in solution concentrations of monomer from about 10% to about 60% are generally desirable. The course of polymerization may be readily followed from the increase in viscosity of the solution. The catalyst may be added in increments, if desired, with or without additional solvent.

A 50% aqueous solution of a water-soluble ureidoalkyl vinyl ether has a viscosity of less than $A_3$ on the Gardner-Holdt scale. After polymerization at 75° C. for 16 hours the viscosity is usually B to D, but may be carried to $Z_4$ as conversion is carried further.

Polymerization in dimethylformamide results in a conversion of monomer to polymer at least as high as in water and usually higher for a given amount of catalyst, but the polymer formed is of lower molecular size than polymers formed in water. For example, a 50% solution of $CH_2:CHOC_2H_4NHCONHCH_3$ in dimethylformamide held at 75° C. for 16 hours readily develops a viscosity of G to I on the Gardner-Holdt scale, but conversion may be carried to a viscosity from D to $Z_4$. The mixture is homogeneous at the end of the polymerization.

For bulk polymerization the preferred temperatures are from about 70° to about 80° C. and the optimum proportion of catalyst is from 0.3% to 1% of the weight of the ureidoalkyl vinyl ether. Under a nitrogen atmosphere a satisfactory degree of polymerization is obtained in 10 to 20 hours.

The polymers which result are soluble substances unless diethylenically unsaturated comonomers are used. The homopolymers of $$CH_2:CHOC_2H_4NHCONHCH_3$$
$$CH_2:CHOC_3H_6NHCONHCH_3$$

and $$CH_2:CHOC_2H_4NCH_3CONHCH_3$$

are of limited solubility in water and are relatively insoluble in acetone and benzene. These polymers may be separated from their monomers by precipitation from their aqueous solutions, for example, by addition of a miscible solvent, such as acetone. These polymers, precipitated as with acetone, are white to light tan solids which can be dried under reduced pressure. A 50% solution, in a 1:1 volume ratio mixture of methanol and water, of the dried polymer has a viscosity of A to Z on the Gardner-Holdt scale. If these polymers are heated above 150° C., they lose their solubility.

With increase in the size of the alkylene groups comprising, A, Y, Z, $R^4$, and $R^5$, and of the groups R, R', $R^2$, and $R^3$ in ethers of the Formulas II, III, IV, and V, the polymers change from water-soluble to solvent-soluble. Thus with increase in size of such groups, the polymer becomes soluble in alcohols or benzene.

The ureidoalkyl vinyl ethers polymerize through their vinyl groups to form polymers having a multiplicity of ureido groups which are available for further reaction when the nitrogen atoms thereof carry reactive hydrogen atoms. It is probably through these groups that cerain of the polymers become cross-linked and insoluble when they are heated above 150° C. These reactive-hydrogen containing groups are also reactive to chemical reagents which combine with urea and like compounds, including aldehydes such as formaldehyde, ketones, isocyanates, isothiocyanates, and the like.

The polymers of the compounds of Formulas III and IV are distinguished from the others by their inertness to further chemical reaction, such as with formaldehyde, ethylene oxide, etc., by their stability and by their relatively completely non-polar character rendering them more soluble in organic solvents of both polar and non-polar types.

The polymers of this invention are classed as high polymers since the polymers are built up of a large number of repeating units. Yet it must be pointed out that the degree of polymerization can readily be controlled by choice of solvent and other conditions of polymerization. In bulk polymerizations or in polymerizations in aqueous solutions polymers of 50,000 to 200,000 molecular weight may be obtained. In many organic solvents, such as dimethylformamide, alcohols, and ethyl acetate molecular weights can be obtained of the order of 10,000 to 20,000.

In contrast to alkyl vinyl ethers which copolymerize under the influence of organic peroxides but poorly and in some cases fail to enter into copolymers, the ureidoalkyl vinyl ethers of the invention have been found widely useful in copolymerizations. It has been found that these ethers can be copolymerized with other polymerizable olefinically unsaturated compounds, particularly vinylidene compounds, under the influence of a polymerization promoter of the free radical type, such as peroxides or azo catalysts, an acyclic azo compound being particularly useful and advantageous. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions.

The same azo catalysts described above for use in forming polymers are used for preparing copolymers, particularly when the major portion of the monomers is a ureidoalkyl vinyl ether of the invention. The amount of catalyst may be varied between 0.1% and 5% of the weight of the monomers to be copolymerized. A range from 0.3% to 1% is preferred, at least at the start. Small amounts of catalyst may be added from time to time as copolymerization proceeds.

When a ureidoalkyl vinyl ether of the invention furnishes the minor portion of an interpolymer, however, other free radical catalysts may prove desirable. For example, organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, 2-vinylpyridine, 4-vinylpyridine, or divinylbenzene; ethylene diacrylate or dimethacrylate, bis(vinoxyethyl)urea, vinoxyethyl acrylate, vinoxypropyl acrylate, etc. Where two polymerizable vinylidene groups occur in the same molecule, as in compounds toward the end of the above list, crosslinking results where more than one to two per cent thereof is used in forming the copolymer.

There are several important types of classes of interpolymers which should be particularly mentioned. Where it is desired to obtain new properties or variations in properties over the properties of the homopolymer of a ureidoalkyl vinyl ether there may be used about 1% to about 60% of one or more other polymerizable vinylidene compounds. Often 1% to 20% is the most useful range to promote the desired modification of properties. Some valuable examples of copolymers of this sort are those obtained with 1% to 20% of vinylpyridine and 99% to 80% of a unreidoalkyl vinyl ether of Formulas II and V and which have water-solubility in the salt form or are soluble in organic solvents, such as methanol, or in aqueous-organic solvent systems, such as aqueous methanol or aqueous acetone. These copolymers have marked affinity for cellulose. Again a copolymer from 1% to 20% of ammonium or alkali metal (i. e. sodium or potassium) salts of acrylic acid, itaconic acid, or methacrylic acid and 99% to 80% of a ureidoalkyl vinyl ether of Formula II is of interest because it supplies properties peculiar to polymers of the ureidoalkyl vinyl ether and yet it can be cured or insolubilized by treatment with polyvalent metal ions, such as aluminum or calcium.

In another important category of interpolymers a ureidoalkyl vinyl ether of Formulas II and V is incorporated in minor amount with another polymerizable vinylidene compound to impart new properties thereto. Here 1% to 50% and preferably 1% to 20% of the ureidoalkyl vinyl ether is mixed with one or more other polymerizable vinylidene compounds and the interpolymer thereof is formed. The presence of reactive hydrogen containing ureido groups from the ether imparts a second stage reactivity to the interpolymers. The presence of such groups may impart such desired properties as solvent-resistance, craze-resistance, hydrophilic properties (from ethers with small alkyl groups), hydrophobic properties (from ethers with larger alkyl groups), thermal activity, reactivity toward such substances as aldehydes, and so on. The ureidoalkyl vinyl ethers may thus be used to modify copolymers for use in coatings, adhesives, films, fibers, castings, etc.

Copolymerization, as has been indicated, may be effected in bulk, in solution, or in dispersion. When the monomers to be copolymerized are water-soluble, they may be copolymerized in aqueous solutions. Solvent-soluble monomers may be handled in inert organic solvents such as benzene, toluene, methanol, ethanol, butanol, acetone, methyl ethyl ketone, dimethylformamide, ethyl acetate, ethylene dichloride, etc. Concentrations from about 10% to 60% are conveniently used. The course of copolymerization may be followed from the changes in viscosity or changes in solubility. Monomers and copolymer may be separated, if desired, by precipitation, extraction, distillation, or other conventional step.

Water-soluble ureidoalkyl vinyl ethers effectively solubilize considerable proportions of otherwise water-insoluble polymers of vinylidene compounds, such as methyl acrylate, methyl methacrylate, vinyl acetate, acrylonitrile, or vinylpyridine. For example, a copolymer from three parts of

and one part of methyl acrylate, or methyl methacrylate, or vinyl acetate is soluble in water even though homopolymers of the latter are not.

Polymerization may also be carried out by techniques useful for forming copolymers in dispersion in aqueous systems. Here a mixture of a ureidoalkyl vinyl ether and another polymerizable vinylidene compound without or with an inorganic solvent is dispersed or suspended in water. An emulsifier and/or dispersing agent may be used. The mixture is usually stirred. A polymerization cataylst is added, or catalyst and activator and, if desired, modifiers, such as buffers, metal ions, mercaptans, and the like. Ordinarily dispersions containing 10% to 60% of polymerizable materials are used. Temperatures from below 0° C. to 100° C. may be used. The preferred temperature range is 15° to 60° C.

In bulk interpolymerizations one or more ureidoalkyl vinyl ethers are mixed with one or more other polymerizable vinylidene compounds and a polymerization catalyst is added. The mixture is maintained at a temperature at which the catalyst is effective for promoting polymerization until reaction is essentially complete. The copolymerization is best carried out under an inert atmosphere.

The polymers of this invention are useful in the fields of paper, coatings, and textiles. The water-dispersible types can be incorporated in spinning dopes such as cuprammonium cellulose to impart insolubility of the final films or fibers. The solvent-soluble types can be incorporated in cellulose acetate, nylon, or polyacrylonitrile dopes to improve the properties of fibers and films therefrom. The polymers themselves can be used to give coatings on paper, for example. They can be applied to textile fibers as finishing agents. The water-soluble and readily water-dispersible polymers, such as the homopolymer of

are useful as whiteness builders or whiteness retention agents for built detergent systems, especially those containing alkyl aryl sulfonates, such as sodium isopropylnaphthalene sulfonate, sodium octyl-phenyl sulfonate and so on.

When certain of the polymers as pointed out above are heated they become crosslinked and insoluble. The latter also react with cellulose, wool, silk, and the like. When large substituents are present, the treated substances become water-repellent. The latter polymers may likewise be mixed with other coating materials. When the films formed from the mixture are heated, crosslinking coupled with solvent resistance is obtained. The latter polymers also react with formaldehyde to form interesting and novel methylol derivatives. These are soluble, reactive condensates which are rendered insoluble when heated. The water-soluble condensates are particularly useful for imparting wet strength to paper. They are useful for bonding rubber to fabric, including tire cord. They are useful for stabilizing wool. These hydroxymethyl compounds can be reacted with alcohols to yield ether derivatives, the simple alcohols yielding the corresponding alkoxymethyl derivatives. These are particularly useful in coating compositions.

The following examples are illustrative of the invention:

*Example I*

(a) A solution of 44 g. (0.5 mole) of 2-aminoethyl vinyl ether in 50 ml. of dry benzene was cooled to 0° C. and treated dropwise with a solution of 35.5 g. (0.5 mole) of ethyl isocyanate in 50 ml. of dry benzene with concommitant stirring. The reaction was maintained at 0–5° C. during the addition and allowed to stir and warm to 30° C. during a period of 30 minutes. The benzene was removed by stripping under reduced pressure, and the product, amounting to 79 g., was isolated as the residual solid. Purification was effected by recrystallization of the product from a mixture of benzene and petroleum ether to give 73 g. of a white crystalline solid, M. P. 55°–57° C., soluble readily in water, methanol or acetone. It contained upon analysis 52.9% C, 8.6% H, and 17.7% N. The corresponding theoretical values for N-(2-vinyloxyethyl)N'-ethylurea,

are 53.2% C, 8.87% H, and 17.7% N. Infrared analysis indicated the presence of a vinyl group which was confirmed by titration with iodine solution.

(b) This material is useful as a bacteriostatic agent showing a 9 mm. zone of inhibition when tested by the Standard Agar-plate technique against *M. pyogenes var. aureus*.

(c) This material is also useful as a special solvent for coupling oil and water-soluble agents such as alkylphenoxypolyethoxyethanols. Clear solutions of water in the amounts of 0.5–10% in kerosene or oil solutions of 1–10% of ethylene oxide condensates are obtained by the inclusion of 1–10% of this vinyloxyethylurea.

(d) The product of this example is useful in the modification of aminoplasts particularly aqueous urea-formaldehyde condensates designed for use as adhesives such as for plywood. Amounts of the N-ethyl-N'-vinyloxyethyl urea from 5–25% are used to replace a corresponding amount of urea in an adhesive condensate. For example 0.25 part of the vinyloxyethyl urea, 0.75 part of urea and 1.7 parts of formaldehyde as a 37% aqueous solution are combined and condensed at pH 7.8–8.2 until the desired degree of water-tolerance is achieved. This condensate shows a greatly improved storage stability as compared to a similar resin prepared entirely from urea. This modified urea condensate is used with an acid or acid-producing catalyst such as ammonium thiocyanate and applied to wood panels. The resultant cures are faster or can be obtained at lower temperatures than with conventional urea resins and the resultant bond shows an increased degree of hot water resistance. Similar advantages are obtained when this vinyloxyethylurea is added to carbamate or melamine-formaldehyde condensates and similar nitrogenous resin-formers.

(e) The compound of this example may be converted to a methylol derivative with aqueous or alcoholic solutions of formaldehyde by warming such mixtures at 40°–100° C. at a pH of 8.5–9.5 for 1–4 hours. The methylol derivative may also advantageously be added to aminoplast condensates.

(f) In a like manner, the following condensations were effected by the procedure of part (a) hereinabove:

1. Methyl isocyanate and 3-aminopropyl vinyl ether
2. Ethyl isocyanate and 2-N-methylaminoethyl vinyl ether
3. n-Dodecyl isocyanate and 2-N-(2-hydroxyethyl) aminoethyl vinyl ether
4. n-Octadecyl isocyanate and 2-N-benzylaminoethyl vinyl ether
5. Ethyl isocyanate and 2-N-p-chlorophenylaminoethyl vinyl ether
6. Cyclohexyl isocyanate and 2-N-octadecylaminoethyl vinyl ether
7. Isobutyl isocyanate and 2-N-cyanoethylaminopropyl vinyl ether
8. Allyl isocyanate and 2-aminoethyl vinyl ether
9. Ethyl isocyanate and 2-N-oleylaminoethyl vinyl ether
10. Ethyl isocyanate and 2-N-crotylaminoethyl vinyl ether.

(g) *Homo-polymerization*.—These monomers except for the N-methyl- and N-ethyl-N'-vinyloxyethyl ureas were not water-soluble and were therefore best polymerized in bulk or in solution in dimethylformamide. Those with long alkyl substituents like dodecyl were toluene-soluble and could be polymerized in that solvent. In general, about 2% by weight of monomer of dimethyl azoisobutyrate was employed as the initiator to give 40%–100% conversions. Amounts of initiator from 0.5–10% can be used.

(h) Fifty grams of N-vinyloxyethyl-N'-ethyl urea was melted in a small flask equipped with a stirrer by heating the flask and contents to 60° C. The air in the flask was displaced with nitrogen and one gram of dimethyl azoisobutyrate added and uniformly mixed with the monomer by stirring. The temperature was adjusted to 65° C. and the reaction was maintained at this temperature in an inert atmosphere for 20 hours. The product was a light-yellow, viscous resin which set to a tacky glass upon cooling. The residual monomer and low-molecular weight polymer was separated by extraction with dry acetone. The polymer, amounting to 20 g., remained as a white powder, insoluble in acetone or water but soluble in methanol, butanol or a mixture of acetone and water.

(i) A solution of the polymer (of part (h)) in butanol containing 30% by weight of solids was applied to panels of glass, metal, and masonite. The panels were dried by heating at 150° C. for 5 minutes after a 30 minute air-dry. The resultant films were hard and glossy with fair adhesion. The films could be dissolved again in butanol. Similar solutions were prepared and treated as follows:

1. Formaldehyde, 20% by weight of resin, and butyl acid phthalate, 4% by weight of resin, were added.
2. N,N'-bismethoxymethylethylene urea, 20% by weight of resin, and p-toluenesulfonic acid, 1% by weight of resin were added.

Each mixture was again filmed onto panels of glass, metal and masonite, air-dried for 30 minutes and heated at 150° C. for 10 minutes. Again the films were hard and glossy. The adhesion was improved and the films were now resistant to water, soap-solutions, and organic solvents.

The presence of an alkyl group on each nitrogen of the N-ethyl-N'-vinyloxyethyl urea had two unexpected and surprising effects. The first was the insolubility of the homo polymer thereof in water even though the monomer was thus soluble. The second was the stability of solutions of the polymer against further self-condensation of a non-vinyl character which is in marked contrast with the characteristic of vinyloxyalkyl urea polymer having two hydrogen atoms on one nitrogen to readily undergo such further condensation. The less polar nature of the N,N'-disubstituted urea and its polymer resulted in a greatly decreased sensitivity of resultant coatings and films to moisture and wider compatability of the polymers with organic solvents.

(j) A solution of the polymer (of part (h)) in methanol is useful as a coating solution for application to plastic coatings such as those of poly(methyl methacrylate) to prevent surface-marring and reduce the build-up of static charges. The polymer may be applied from aqueous methanol or acetone to Dacron, nylon, Orlon or other synthetic filament and staple yarns as a warp-size. Such treatment greatly increases the weaving time between yarn breaks and reduces pilling and fuzz-balling.

(k) A solution of the polymer (of part (h)) in acetone containing 10% by volume of water may be added to acetone solutions of cellulose acetate in amounts of 1–25% or more by weight of polymer based on acetate and the mixture then coagulated into films or fibers. The treated acetate shows improved tensile properties and a change in wet-tensile and dyeability dependent on the amount of urea polymer present. Such fibers and films may be further changed by including formaldehyde or acetaldehyde and acid in the original spinning solution or by aftertreating the fibers or films therewith. Such fibers or films when cured as by heating at 200–300° F. for 10–60 minutes are solvent-insoluble and show less extensibility both dry and wet.

Similarly, other film-forming materials capable of being coagulated or regenerated from solution or formed by melt extrusion or spinning may be modified by inclusion of the polymeric urea again in amounts of 1–25%. For example, a solution of an acrylonitrile polymer in dimethylformamide is mixed with five percent by weight of the polymeric urea and a fiber is formed by extrusion into a coagulating bath. The resultant fiber shows a greater affinity for dyes than a corresponding unmodified polyacrylonitrile fiber. Similarly, copolymers of acrylonitrile or polymers and copolymers of vinyl chloride may be so modified with improvement in dyeability.

The polymer of this example is useful as in thickening solutions of various compounds in alcohol, acetone, or mixtures of water with these solvents. It is also useful as a dispersant particularly as a soil-suspending or redispersing agent.

(l) *Polymethylol derivative of polymer of Example 1 (h).*—Although the polymer of Example 1 (h) is not soluble in water, it is readily soluble in a 37% solution of formaldehyde in water adjusted to a pH of 8.5. A solution of the polymer was prepared by adding one mole of the polymer to an aqueous solution containing two moles of formaldehyde per mole of the urea and heating the mixture at 10% to 60% solids at 60° C. for one hour. Titration of the resulting solution for free formaldehyde indicated that more than 50% of the urea groups had been converted to methylol groups. The resulting solution was also infinitely dilutable with water, the polymethylol derivative being water-soluble. This solution was stable for weeks at room temperature and for months if kept at 10° C. or less and at a pH greater than 7.0. If acidified to a pH lower than 5.0, the polymer becomes insoluble and the solution forms a gel slowly at room temperature and rapidly if warmed.

The polymethylol compound can be isolated as a buff solid by freeze-drying or carefully spray-drying the alkaline, aqueous solution. The powder is quite stable and can be redissolved in water to give clear solutions useful in coatings, laminates, textiles and molding compositions.

(m) A wool fabric was padded through a 10% solution of the polymethylol compound of part (l) containing triethylamine phosphate at 0.5% so that the fabric gained between 2 and 5% by weight of resin. The fabric was then dried and cured at 300° F. for ten minutes. The resultant fabric after 300 minutes of washing in a launderometer showed less than 5% area shrinkage compared to 40% for an untreated control. The fabric had a somewhat crisp though not undesirable hand.

(n) Twenty parts of the polymethylol resin of part (l) as a 40% aqueous solution was added to 100 parts of a resin prepared by the condensation of diethylene glycol dicarbamate with formaldehyde and methanol at 40% in a methanol-water mixture. The resultant mixture was catalyzed with p-toluenesulfonic acid and filmed on glass and masonite panels. In one hour, tack-free, glossy films had formed that showed fair resistance to water and methanol. A ten minute cure at 60° C. gave water-resistant films. Similar films prepared without the addition of the polyurea resin showed no water-resistance.

(o) The dried, relatively anhydrous polymethylol compound of part (l) was mixed with a slurry of sawdust and urea-formaldehyde condensate containing ammonium thiocyanate. The product was molded and heated in a press at 100 pounds at 150° C. for 10 minutes. The resulting briquet was hard, smooth and much more water-resistant than a corresponding control prepared without the aforesaid polymethyol compound. Similarly, paper was impregnated with the polymethylol solution, catalyzed with acid, laminated in a press and heated. The resultant product was hard and resistant to water, soap, and solvents.

(p) Alkylated polymethylol compounds may be prepared from the polymer of part (h) by reacting the polymer with formaldehyde in methanol, butanol or other alcohols in place of part or all of the water used in part (k) hereof. The procedure is the same as described for the aqueous solution. Careful acidification of the methylol compound in an alcohol to pH 4.0 and warming at 60°–100° C. for 1–4 hours gives the corresponding polyalkoxymethyl-poly(N - ethyl - N' - vinoxyethyl urea). These compounds are readily solvent-soluble and useful as coating media along or modified by the addition of alkyd resins or other solvent-soluble coating materials, such as gums, rosin-ester, linseed-oil esters and the like. A typical composition comprises 40% of resin solids in a vehicle, such as xylene, the resin being composed of 25 parts of the polyalkoxymethyl derivative and 75 parts of a short-oil non-drying alkyd. This vehicle may be pigmented in the usual manner by ball or roller-milling and catalyzed with butyl acid phthalate. Coatings applied to bonderized steel and baked at 125° C. for 30 minutes are hard, glossy, solvent and soap-resistant and useful as refrigerator or appliance finishes. They are characterized by good indoor and outdoor durability.

(q) The aqueous or alcoholic solutions of the polymethylol compound of parts (l) and (p) are also useful in the treatment of fabrics. Rayon material is padded through a solution of the polymethylol compound containing ethanolamine hydrochloride. The rolls are adjusted so that a 2% resin pickup is obtained. The fabric is dried and cured at 280° F. for 12 minutes. The resulting material may now be laundered with less than 1–2% area shrinkage and has a full somewhat crisp hand. Nylon net may similarly be padded through the polymethylol solution to give a pickup of 5% resin solids. Subsequent cure and laundering give a durable, stiff finish desirable for this type of material.

(r) A mixture of 50 parts of N-ethyl-N'-vinyloxyethyl urea, 50 parts of N-octadecyl-N'-vinyloxyethyl urea and 3 parts of dimethyl azoisibutyrate was stirred and heated at 65° for 8 hours in an atmosphere of nitrogen. The resultant polymer was a waxy solid readily soluble in toluene. A solution of the polymer in toluene was emulsified by mixing with water containing 0.5% of an octyl polyoxyethylene phenol containing an average of 30 ethylene oxide groups. The emulsion was exhausted onto cotton gabardine and the treated fabric dried. The resultant material was found to have a soft hand and to be water-repellent. A second portion of fabric after treatment with the emulsion was dipped into a formaldehyde solution acidified to pH 3.5 and then dried and cured at 300° F. for 10 minutes. Again a soft, water-repellent fabric was obtained that retained its repellency after several dry-cleanings.

(s) A solution of 40 parts of ethyl acrylate, 50 parts of methyl methacrylate, 10 parts of N-ethyl-N'-vinyloxyethyl urea, and 0.5 part of benzoyl peroxide in 250 parts of 2-ethoxyethyl acetate were added slowly to a stirred reaction vessel maintained at 80° C. by external heating. The rate of heating and addition was adjusted to maintain this temperature during the 2 hours required for the addition to be completed. An additional 0.5 part of benzoyl peroxide in 50 parts of 2-ethoxyethyl acetate was added in two equal portions at 1 hour intervals while stirring and maintaining the reaction at 80° C. The final product had a Gardner-Holdt viscosity of U+ at 38.8% solids and was a light-yellow, clear resin solution.

Films prepared by casting this solution on glass or metal and baked at 125° C. for 30 minutes were glossy with a pencil hardness of H. A portion of the solution mixed with 20% by weight (on the resin) of bis-methoxymethyl-ethylene urea and 1% of p-toluenesulfonic acid and again filmed and baked gave glossy films of improved adhesion and unaffected by immersion in cellosolve acetate for one hour. This mixture when pigmented with titanium dioxide, sprayed and baked, gave a glossy, white resistant finish eminently suited for refrigerators, washers, air-conditioners, and other coated metal appliances.

In a similar manner, a coating containing a copolymer of 30 parts of acrylonitrile, 60 parts of methyl methacrylate and 10 parts of ethyl-vinyloxyethyl urea was prepared. When modified with the bis-methoxymethyl-ethylene urea and catalyst and baked, the films had a hardness of 7H and a microknife adhesion of 4.5 with excellent gloss, solvent and alkali-resistance.

(t) A charge of 10 parts by weight of N-ethyl-N'-vinyloxyethyl urea and 90 parts of butyl acrylate was placed in a closed vessel with 125 parts of water and 5 parts of t-octylpolyethyleneoxyethyl phenol having an average of 40 oxyethylene units per molecule. The mixture is agitated at 20° C. under a nitrogen atmosphere. Then 0.3 part of ammonium persulfate and 1 part of diethylene triamine were added and agitation continued. The temperature rose to 40–45° C. during copolymerization. The polymer dispersion obtained was stable to storage under normal conditions for several months. It was applied to panels of wood, glass and steel and the coatings were dried and baked at 125° C. When applied to a wool fabric in the proportion of 7% on the weight of the fabric, the fabric after 300 minutes of laundering showed greatly reduced shrinkage and a soft hand.

*Example II*

(a) A solution of 14.1 g. (0.1 mole) of 2-isocyanato-isobutyl vinyl ether in 50 ml. of dry benzene was added slowly with stirring to 18.5 g. (0.1 mole) n-dodecylamine in 50 ml. of benzene in a flask maintained at 0–5° C. by means of an ice-bath. The rate of addition was adjusted to maintain the temperature below 10°. When the addition was complete, stirring was continued for sixteen hours and the temperature was allowed to rise to 30°. Volatiles and solvent were removed by stripping at reduced pressure to give 31 g. of product as a viscous, yellow oil that gradually solidified. The product was recrystallized from a mixture of methanol and water and found to melt at 30°–35°, just about room temperature. It contained 8.3% nitrogen as compared to 8.59% demanded by theory for N-dodecyl-N'-(1,1-dimethyl-2-vinyloxy-ethyl)-urea, $$CH_2=CHOCH_2C(CH_3)_2NHCONHC_{12}H_{25}$$

The purified material was isolated as white, plate-like crystals, partially melting at room temperature and soluble in methanol, acetone and benzene but insoluble in water.

(b) This procedure is particularly advantageous for the preparation of ureas of Formula II in which R' may be substituted with groups otherwise difficult to obtain and also for making compounds of Formula III above.

Thus, in place of dodecylamine, in part (a) hereof, substitute:

1. Hydroxyethylamine
2. Dimethylaminopropylamine
3. 2-aminoethylpyridine
4. 5-chloropentylamine
5. Methallylamine
6. Dimethylamine
7. Diethylamine
8. Di-(2-ethylhexyl)amine
9. Dicyclohexylamine
10. Diethanolamine
11. Di(2-cyanoethyl)amine
12. Bis(3-dimethylaminopropyl)amine
13. Methylbenzylamine
14. Piperidine
15. Morpholine (c) By the procedure of part (a) hereof, 1,1,5-trimethyl-7-vinyloxyheptylisocyanate,

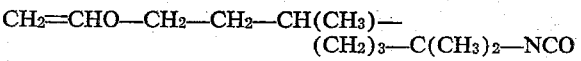

is separately condensed with each of the following amines:
1. Butoxyethylamine
2. 3-aminopropylmorpholine
3. 5-hydroxypentylamine
4. Di-(isopropanol)amine
5. Oleylamine
6. Butylamine

*Example III*

(a) A mixture of 50 parts of the dodecylvinoxyiso-butyl urea of Example II (a) and one part of dimethyl azoisobutyrate were melted at 40° C. and intimately mixed. Air was displaced in the container by nitrogen and the polymerization was effected at 75° C. for sixteen hours to give a viscous resin. Monomer was separated by washing the resin with acetone. Seventeen parts of polymer, insoluble in acetone, methanol or heptane, was obtained. The polymer was a white solid, soluble in benzene.

(b) A solution of 100 parts of the urea of Example II (a), 100 parts of toluene, and 2 parts of dimethyl azoisobutyrate was heated in an inert atmosphere at 75° C. for sixteen hours. The polymer was isolated by precipitation with benzene and amounted when dried to 26 parts.

*Example IV*

(a) To a stirred, cooled solution of 83 parts of t-octyl-isocyanate in 100 parts of benzene, there was added slowly 46.5 parts of 2-aminoethyl vinyl ether. The temperature gradually rose to 70° C. during the addition and was maintained there for 10 minutes after the addition was complete. The product was isolated by removal of the solvent at reduced pressure; cooling induced the product to crystallize completely. Recrystallization from a mixture of methanol and water gave 101 parts of white, crystalline plates, M. P. 55°–58° C., containing 10.4% of nitrogen and 64.3% of carbon by analysis corresponding to N-t-octyl-N'-vinyloxyethyl urea

This compound was found to be an excellent contact insecticide giving good control of red-spider mites with no foliage injury. In addition, it gave good residual control and showed some activity as a mite ovacide. For example, a 12.5% emulsion concentrate prepared in Han solvent (a purified petroleum fraction) gave 95% kill of red spiders when applied at 1 part in 800, no foliage injury and 22% control of mite eggs. At 1 part in 3200 a 61% kill was obtained.

In addition this compound is bacteriostatic showing a 9 mm. zone of inhibition against *M. pyogenes var. aureus* by the agar plate technique.

(b) By the procedure of part (a) hereof, the following compounds were reacted:

1. t-Butyl isocyanate and 2-aminodecyl vinyl ether
2. t-Dodecyl isocyanate (prepared from propylene tetramer) and 2-N-ethylaminoethyl vinyl ether
3. t-Tetracosanyl isocyanate (prepared from octylene trimer) and 2-aminopropyl vinyl ether
4. t-Octadecyl isocyanate (prepared from nonene dimer) and 2-aminobutyl vinyl ether (c) A mixture of 10 parts of the urea of part (a)

hereof and 0.15 part of dimethyl azoisobutyrate were melted at 60° C. and mixed. Polymerization was effected by heating the mixture in an inert atmosphere for 20 hours at 75° C. The resultant product was a white, hard resin that was purified by solution in toluene and precipitation with petroleum ether. Repetition of this process gave 4.3 parts of pure polymer as a white solid, soluble in toluene.

Example V

A solution of 39.5 g. (0.25 mole) of 3-methyl-3-nitrobutylisocyanate in 60 ml. of dry benzene was cooled, stirred and treated dropwise with 21.8 g. (0.25 mole) of 2-aminoethyl vinyl ether while the temperature was maintained at 10° C. by means of an ice-bath. When the addition was complete, the reaction was warmed to 70° C. and then cooled. Solvent was removed in vacuo and the product obtained as a viscous mass that gradually crystallized. Several recrystallizations from a mixture of methanol and water gave a pure product, M. P. 50°–55° C., containing 49.2% carbon, 7.71% hydrogen, and 17.16% nitrogen. The theoretical values for N-vinyloxyethyl-N'-(3-methyl-3-nitrobutyl) ureas $$CH_2=CHOCH_2CH_2NHCONHCH_2CH_2C(CH_3)_2NO_2$$

are 49.0% carbon, 7.76% hydrogen, and 17.15% nitrogen.

The requisite isocyanate was prepared from the adduct of 2-nitropropane and ethyl acrylate by hydrolysis to the acid, conversion to the acid chloride, thence to the azide with sodium azide and thermal rearrangement to the isocyanate. The important intermediates are formularized below:

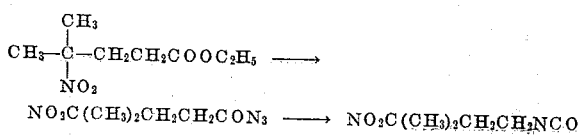

$$NO_2C(CH_3)_2CH_2CH_2CON_3 \longrightarrow NO_2C(CH_3)_2CH_2CH_2NCO$$

Example VI (a) A solution of 60.0 g. (1.0 mole) of ethyl isocyanate in 100 ml. of benzene was added to a stirred, cooled solution of 130 g. (1.0 mole) of 5-aminopentyl vinyl ether in 150 ml. of benzene. The solution was maintained at 0–5° C. during the addition and for 30 minutes thereafter. The product precipitated from the reaction mixture and was isolated by filtration as white, shiny plates. When dry, they amounted to 160 g., an 84% yield, M. P. 75°–77° C. and contained 13.7% nitrogen and at least 14.4% vinyl by iodine titration. The theoretical values for N-ethyl-N'-vinyloxypentyl urea $$CH_2=CHO(CH_2)_5NHCONHC_2H_5$$

are 14.7% N and 15.2% vinyl.

(b) In a similar manner the following compounds were reacted:

1. Ethyl isocyanate and 4-aminobutyl vinyl ether
2. Dodecyl isocyanate and 4-aminocyclohexyl vinyl ether
3. Methyl isocyanate and 2-amino-1-hexadecylethyl vinyl ether

Example VII (a) A mixture of 69 g. (0.5 mole) of potassium carbonate, 150 ml. of water, 100 ml. of toluene and 57.5 g. (0.5 mole) of 2-amino-2-methylpropyl vinyl ether was stirred, cooled and treated with 53.5 g. (0.5 mole) of dimethylcarbamyl chloride in 100 ml. of toluene. When the addition was complete the mixture was heated to reflux for 2 hours, cooled, filtered and the layers separated. The organic layer was dried, concentrated and distilled and a heart cut, B. P. 86° C./0.5 mm., selected for analysis. This fraction crystallized upon standing and contained 14.8% nitrogen and 17.9% vinyl ether by iodine titration. The theoretical values for N,N-dimethyl-N'-(1,1-dimethyl-2-vinyloxyethyl) urea

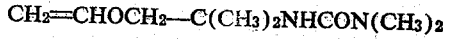

are 15.1% nitrogen and 23.1% vinyl ether. Infrared analysis indicated the presence of a vinyl ether group and reaction with hydroxylamine hydrochloride gave the theoretical value for acetaldehyde.

(b) A mixture of 115 g. (1.0 mole) of 2-amino-2-methylpropyl vinyl ether and 100 ml. of toluene was stirred and treated with 53.5 g. (0.5 mole) of dimethylcarbamyl chloride while maintaining the temperature at 40°–50° C. An exotherm was observed that lasted about one hour after which the reaction was warmed at 50° C. for two hours. The mixture was cooled and then added slowly to 30 g. of caustic dissolved in 200 ml. of water. The layers were separated and the organic layer was dried and concentrated to give the product as an oil that solidified immediately on cooling. Recrystallization from aqueous ethanol gave 45 g. of white crystals, M. P. 59°–61° C., readily soluble in ethylene dichloride, benzene, ethyl acetate, dioxane, methanol or chloroform and insoluble in hot or cold water.

The compound was found to be a bacteriostatic agent giving a 9 mm. zone of inhibition against *M. pyogenes var. aureus* when tested on an agar plate.

(c) By the procedures of parts (a) and (b) hereof, the following were reacted:

1. Diethylcarbamyl chloride and 3,7-dimethyl-7-amino octyl vinyl ether
2. Dicyclohexylcarbamyl chloride and 2-amino-2-methyl propyl vinyl ether (d) Bulk polymerization of the urea of part (a) hereof by means of 2 percent by weight of dimethyl azoisobutyrate at 75° C. gave a clear, yellow resin, hard to the touch with excellent adhesion to glass.

Example VIII

By the procedure of Example VII (a) there were reacted:

1. Dimethylcarbamyl chloride and 4-aminobutyl vinyl ether
2. Diethylcarbamyl chloride and 5-aminopentyl vinyl ether
3. Didodecylcarbamyl chloride and 10-aminodecyl vinyl ether The resulting urea derivatives were polymerized by the bulk procedure of Example VII (d). The final polymers were clear, slightly yellow solids at room temperature.

Example IX (a) There were reacted as in Example VII (a):

1. Dimethylcarbamyl chloride and 2-N-octadecylaminoethyl vinyl ether
2. Diethylcarbamyl chloride and 2-N-benzylaminoethyl vinyl ether
3. N,N-pentamethylenecarbamyl chloride and 2-(N-methylamino)-1-methylethyl vinyl ether
4. N-morpholinocarboxylic acid chloride and 2-N-butylamino-ethyl vinyl ether
5. Dicyclohexylcarbamyl chloride and 2-N-cyclohexylaminoethyl vinyl ether
6. Dioctadecylcarbamyl chloride and 2-N-methylaminoethyl vinyl ether (b) The resulting monomers were polymerized by the procedure of Example VII (d). The solid polymers obtained were clear, slightly yellowish products, which were readily soluble in one or more of such solvents as acetone, dioxane, dimethylformamide, dimethylacetamide, acetonitrile and nitromethane to produce solutions from which coatings, films, and variously shaped products were obtained.

A copending application of the present applicant with

Vincent J. Mozer, in the hands of a common assignee, having Serial No. 409,255, filed February 9, 1954, claims papers having high wet strength obtained by the incorporation of compounds disclosed and claimed herein in the paper and processes for making such paper.

I claim:

1. A composition of matter comprising a compound selected from the group consisting of:

$$CH_2:CHO—A—NRCONHR'$$
$$CH_2:CHO—A—NR^2CONR'R^3$$
$$CH_2:CHO—Y—C(R^4)(R^5)NHCONR'R^3$$

and $$CH_2:CHO—Z—NHCONR'R^3$$

wherein A is selected from the group consisting of the cyclohexylene group and alkylene groups of 2 to 18 carbon atoms, of which a chain of at least two is connected between the adjoining nitrogen and oxygen atoms, R is selected from the group consisting of hydrogen and a monovalent hydrocarbon group of 1 to 18 carbon atoms, R' is selected from the group consisting of aliphatic and cycloaliphatic hydrocarbon groups of 1 to 24 carbon atoms, $R^2$ is a monovalent hydrocarbon group of 1 to 18 carbon atoms, $R^3$ is selected from the group consisting of aliphatic and cycloaliphatic hydrocarbon groups of 1 to 24 carbon atoms, Y is an alkylene group of 1 to 2 carbon atoms, $R^4$ is an alkyl group of 1 to 4 carbon atoms, $R^5$ is an alkyl group of 1 to 4 carbon atoms, and Z is selected from the group consisting of the cyclohexylene group and alkylene groups of 4 to 18 carbon atoms of which a chain of at least 4 is connected between the adjoining nitrogen and oxygen atoms.

2. A composition of matter comprising a polymer of a compound defined in claim 1.

3. A composition of matter comprising a copolymer of a compound defined in claim 1 with another monoethylenically unsaturated monomer.

4. A composition of matter comprising a compound having the formula $$CH_2:CHO—A—NRCONHR'$$

wherein A is an alkylene group of 2 to 18 carbon atoms, of which a chain of at least two is connected between the adjoining nitrogen and oxygen atoms, R is hydrogen, and R' is an aliphatic hydrocarbon group of 1 to 24 carbon atoms.

5. A composition of matter comprising a polymer of a compound of claim 4.

6. A composition of matter comprising a compound having the formula $$CH_2:CHO—A—NR^2CONR'R^3$$

wherein A is an alkylene group of 2 to 18 carbon atoms, of which a chain of at least two is connected between the adjoining nitrogen and oxygen atoms, $R^2$ is a monovalent aliphatic hydrocarbon group of 1 to 18 carbon atoms, R' is an aliphatic hydrocarbon group of 1 to 24 carbon atoms, and $R^3$ is an aliphatic hydrocarbon group of 1 to 24 carbon atoms.

7. A composition of matter comprising a polymer of a compound of claim 6.

8. A composition of matter comprising a compound having the structure of formula $$CH_2:CHO—Y—C(R^4)(R^5)NHCONR'R^3$$

wherein Y is an alkylene group of 1 to 2 carbon atoms, R' is an aliphatic hydrocarbon group of 1 to 24 carbon atoms, $R^3$ is an aliphatic hydrocarbon group of 1 to 24 carbon atoms, $R^4$ is an alkyl group of 1 to 4 carbon atoms, and $R^5$ is an alkyl group of 1 to 4 carbon atoms.

9. A composition of matter comprising a polymer of a compound of claim 8.

10. A composition of matter comprising a compound having the structure of the formula $$CH_2:CHO—Z—NHCONR'R^3$$

wherein Z is an alkylene group of 4 to 18 carbon atoms of which a chain of at least 4 is connected between the adjoining nitrogen and oxygen atoms, R' is an aliphatic hydrocarbon group of 1 to 24 carbon atoms, and $R^3$ is an aliphatic hydrocarbon group of 1 to 24 carbon atoms.

11. A composition of matter comprising a polymer of a compound of claim 10.

12. A composition of matter comprising N-ethyl-N'-vinyloxyethyl urea.

13. A composition of matter comprising a polymer of N-ethyl-N'-vinyloxyethyl urea.

14. A composition of matter comprising N-n-dodecyl-N'-vinyloxyisobutyl urea.

15. A composition of matter comprising a polymer of N-n-dodecyl-N'-vinyloxyisobutyl urea.

16. A composition of matter comprising N-t-octyl-N'-vinyloxyethyl urea.

17. A composition of matter comprising $$CH_2:CHOC_2H_4N(CH_3)CON(CH_3)_2$$

18. A composition of matter comprising $$CH_2:CHOCH_2C(CH_3)_2NHCON(CH_3)_2$$

References Cited in the file of this patent

UNITED STATES PATENTS

| | | |
|---|---|---|
| 2,326,287 | Coffman | Aug. 10, 1943 |
| 2,683,727 | Martin | July 13, 1954 |
| 2,689,844 | Melamed | Sept. 21, 1954 |